United States Patent
Hashizume et al.

(10) Patent No.: US 10,001,784 B2
(45) Date of Patent: Jun. 19, 2018

(54) SMALL BOAT POSTURE CONTROL APPARATUS

(71) Applicant: Honda Motor Co., Ltd., Tokyo (JP)

(72) Inventors: Takashi Hashizume, Wako (JP); Ryuichi Kimata, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days. days.

(21) Appl. No.: 15/448,307

(22) Filed: Mar. 2, 2017

(65) Prior Publication Data

US 2017/0255205 A1  Sep. 7, 2017

(30) Foreign Application Priority Data

Mar. 7, 2016 (JP) .................................. 2016043018

(51) Int. Cl.
| | |
|---|---|
| *G05D 1/08* | (2006.01) |
| *B63H 20/10* | (2006.01) |
| *B63H 20/12* | (2006.01) |
| *B63H 20/00* | (2006.01) |
| *B63J 99/00* | (2009.01) |

(52) U.S. Cl.
CPC .......... *G05D 1/0875* (2013.01); *B63H 20/10* (2013.01); *B63H 20/12* (2013.01); *B63B 2758/00* (2013.01); *B63B 2760/00* (2013.01); *B63H 2020/003* (2013.01); *B63J 2099/008* (2013.01)

(58) Field of Classification Search
CPC ...... G05D 1/0875; B63H 20/10; B63H 20/12; B63H 2020/003; B63B 2758/00; B63B 2760/00; B63J 2099/008
USPC .......................................................... 701/21
See application file for complete search history.

(56) References Cited

U.S. PATENT DOCUMENTS 7,984,684 B2 * 7/2011 Hinderks .................. B63B 1/28
114/274

FOREIGN PATENT DOCUMENTS

JP  2858133 B2  2/1999

* cited by examiner

*Primary Examiner* — Marthe Y Marc-Coleman
(74) *Attorney, Agent, or Firm* — Duft Bornsen & Fettig LLP

(57) ABSTRACT

In an apparatus for controlling posture of a small boat having a hull and an even number of outboard motors mounted side by side on a stern of the hull, each equipped with a propeller driven by an engine and a throttle actuator adjusting a throttle valve opening of the engine, an inclinometer is installed in one of the outboard motors that produces an output indicating inclination of the hull relative to a vertical axis around a roll axis. It is determined whether the hull inclines to port or starboard from the output of the inclinometer and when it does, operation of the throttle actuators of the outboard motors are controlled on a side determined to incline downward to increase engine speed, while controlling operation of the throttle actuator of the outboard motor on a side determined to incline upward to decrease the engine speed.

14 Claims, 8 Drawing Sheets

LEFT OUTBOARD MOTOR PROPELLER IS TURNED COUNTERCLOCKWISE AND ACTS TO INCLINE HULL RIGHTWARD.

RIGHT OUTBOARD MOTOR PROPELLER IS TURNED CLOCKWISE AND ACTS TO INCLINE HULL LEFTWARD.

FIG. 6
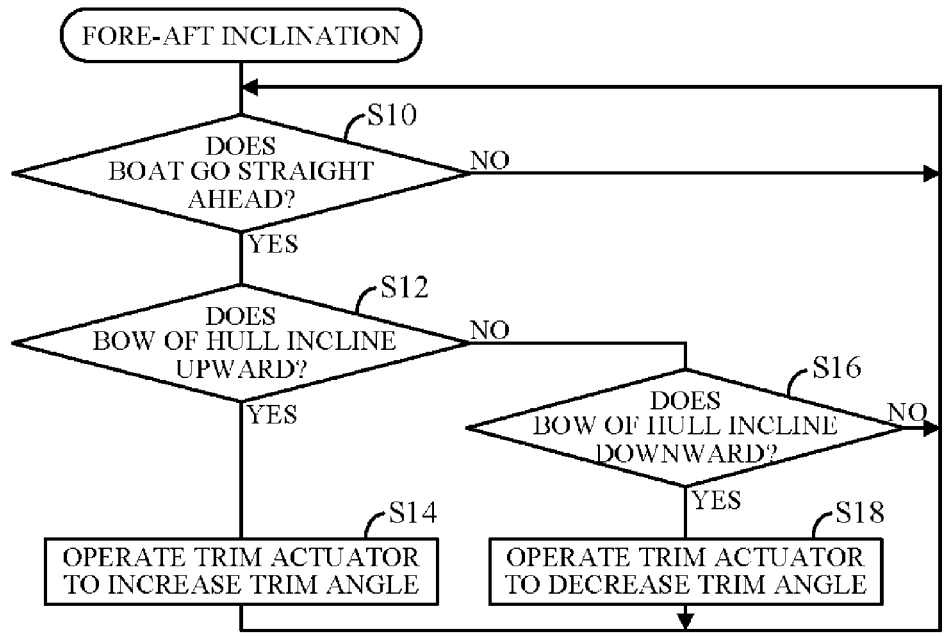
FIG. 7A    FIG. 7B
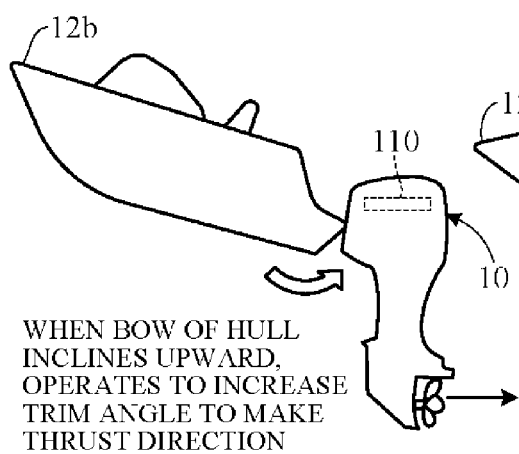
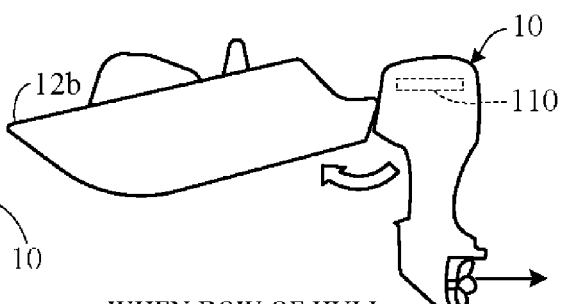
WHEN BOW OF HULL INCLINES UPWARD, OPERATES TO INCREASE TRIM ANGLE TO MAKE THRUST DIRECTION PARALLEL TO WATER SURFACE
WHEN BOW OF HULL INCLINES DOWNWARD, OPERATES TO DECREASE TRIM ANGLE TO MAKE THRUST DIRECTION PARALLEL TO WATER SURFACE WHEN HULL INCLINES TO PORT, OPERATE THROTTLE ACTUATORS TO INCREASE ENGINE SPEED AT PORT SIDE AND DECREASE ENGINE SPEED AT STARBOARD SIDE WHEN HULL INCLINES TO STARBOARD, OPERATE THROTTLE ACTUATORS TO INCREASE ENGINE SPEED AT STARBOARD SIDE AND DECREASE ENGINE SPEED AT PORT SIDE

SMALL BOAT POSTURE CONTROL APPARATUS

CROSS-REFERENCE TO RELATED APPLICATIONS

This application is based upon and claims the benefit of priority from Japanese Patent Application No. 2016-043018 filed on Mar. 7, 2016, the contents of which are incorporated herein by reference.

BACKGROUND OF THE INVENTION

Field of the Invention

This invention relates to a posture control apparatus of a small boat such as a motorboat.

Description of Related Art

In the case of a small boat such as a motorboat, particularly a small boat equipped with an even number of outboard motors mounted side by side on the hull, such as a so-called twin-outboard boat, the propellers are counter-rotated to balance propeller reaction forces. Notwithstanding, side-to-side inclination or tilt readily occurs owing to hull center of gravity variation and other causes, and even fore-aft inclination or tilt between the bow and stern of the ship may occur.

Regarding this point, Japanese Patent No. 2,858,133 proposes with respect to single outboard stabilization a technology for mitigating hull inclination by providing a pair of trim tabs installed on the stern for controlling hull posture and an output mechanism capable of controlling their angles, controlling the trim tab angles based on boat speed, and controlling the angles of the pair of trim tab in the same direction when no steering torque is inputted and in opposite directions when steering torque is inputted.

SUMMARY OF THE INVENTION

The technology described in the reference is configured to mitigate boat inclination. However, the control uses indirect parameters such as boat navigation speed or steering torque, which makes adequate boat stabilization hard to achieve. Moreover, a complicated mechanism such as trim tabs is required.

An object of this invention is therefore to overcome the aforesaid problem by providing a small boat posture control apparatus that directly detects inclination relative to a vertical axis of a boat and reliably stabilizes posture by control based thereon.

In order to achieve the object, this invention provides an apparatus and method for controlling posture of a small boat having a hull and an even number of outboard motors mounted side by side on a stern of the hull, each of the outboard motors being equipped with a propeller driven by a built-in engine and a throttle actuator capable of adjusting opening of a throttle valve installed in the engine. An inclinometer is installed in at least one of the outboard motors that produces an output indicating inclination of the hull relative to a vertical axis around a roll axis. It is determined whether the hull inclines to port or starboard from the output of the inclinometer and when it is determined that the hull does, operation of the throttle actuators of the outboard motors are controlled on a side determined to incline downward to increase speed of the engine, while controlling operation of the throttle actuator of the outboard motor on a side determined to incline upward to decrease the speed of the engine.

BRIEF DESCRIPTION OF THE DRAWINGS

The objects, features, and advantages of this invention will become cleaner from the following description of embodiments in relation to the attached drawings, in which:

FIG. 6 is a flowchart showing operation of the posture control apparatus of FIG. 5;

FIGS. 7A and 7B are explanatory diagrams for also explaining the operation of FIG. 6;

DETAILED DESCRIPTION OF THE INVENTION

Modes for implementing the small boat posture control apparatus according to this invention are explained with reference to the attached drawings in the following.

Figure 1:
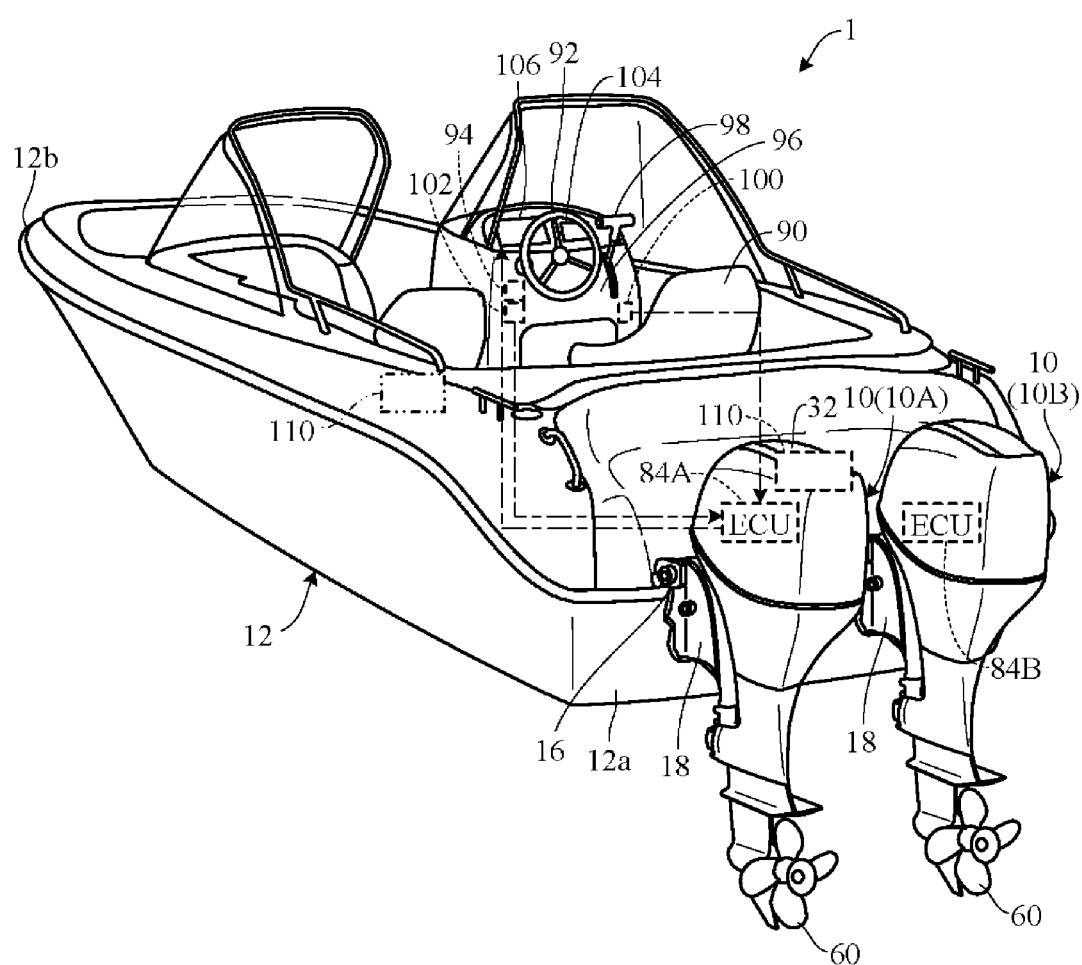
FIG. 1 is a schematic diagram generally illustrating a small boat (small boat A) in the small boat collision avoidance apparatus according to a first embodiment of this invention.
Figure 2:
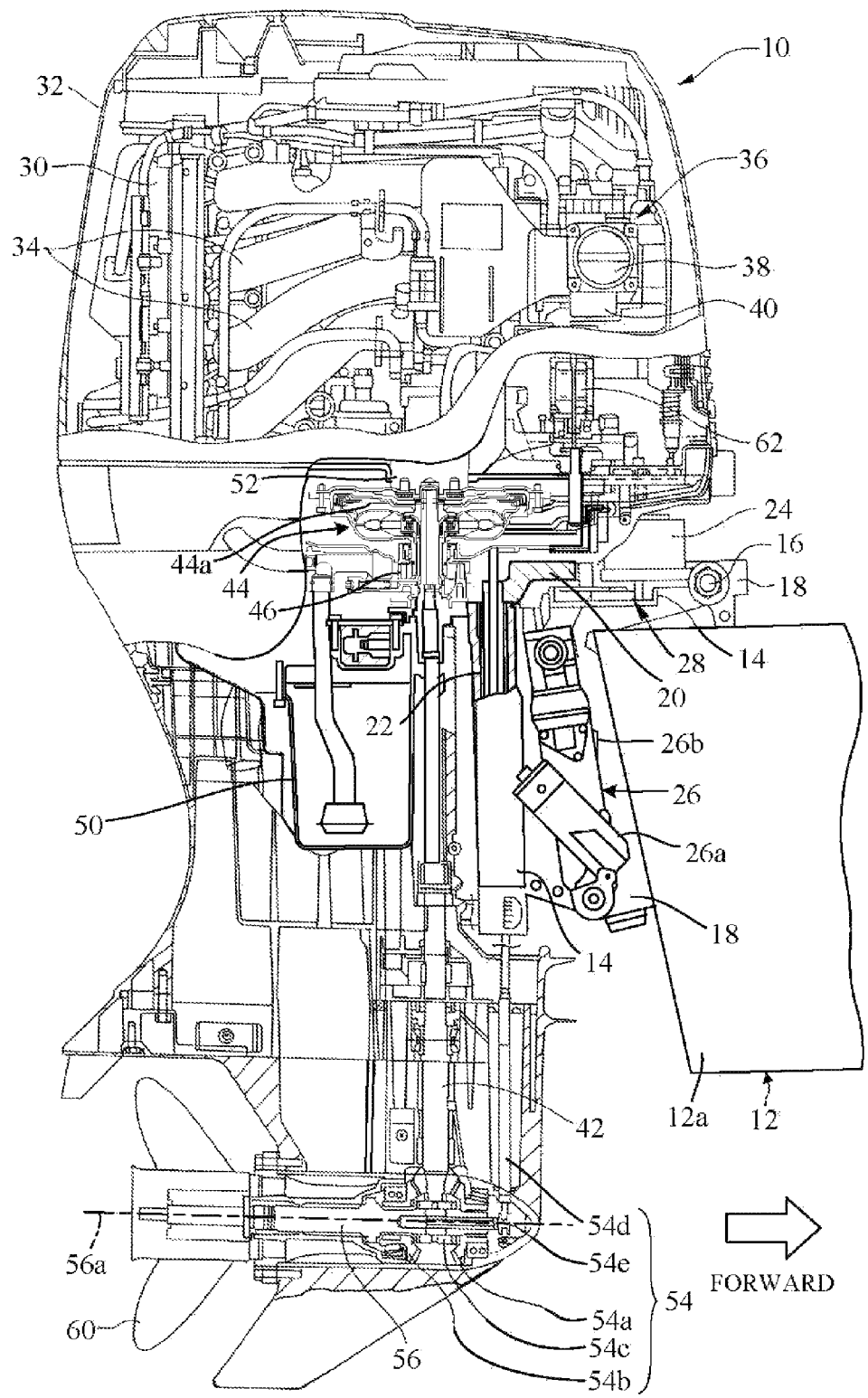
FIG. 2 is an enlarged (partially cross-sectional) side view of an outboard motor mounted on the small boat A of FIG. 1.
Figure 3:
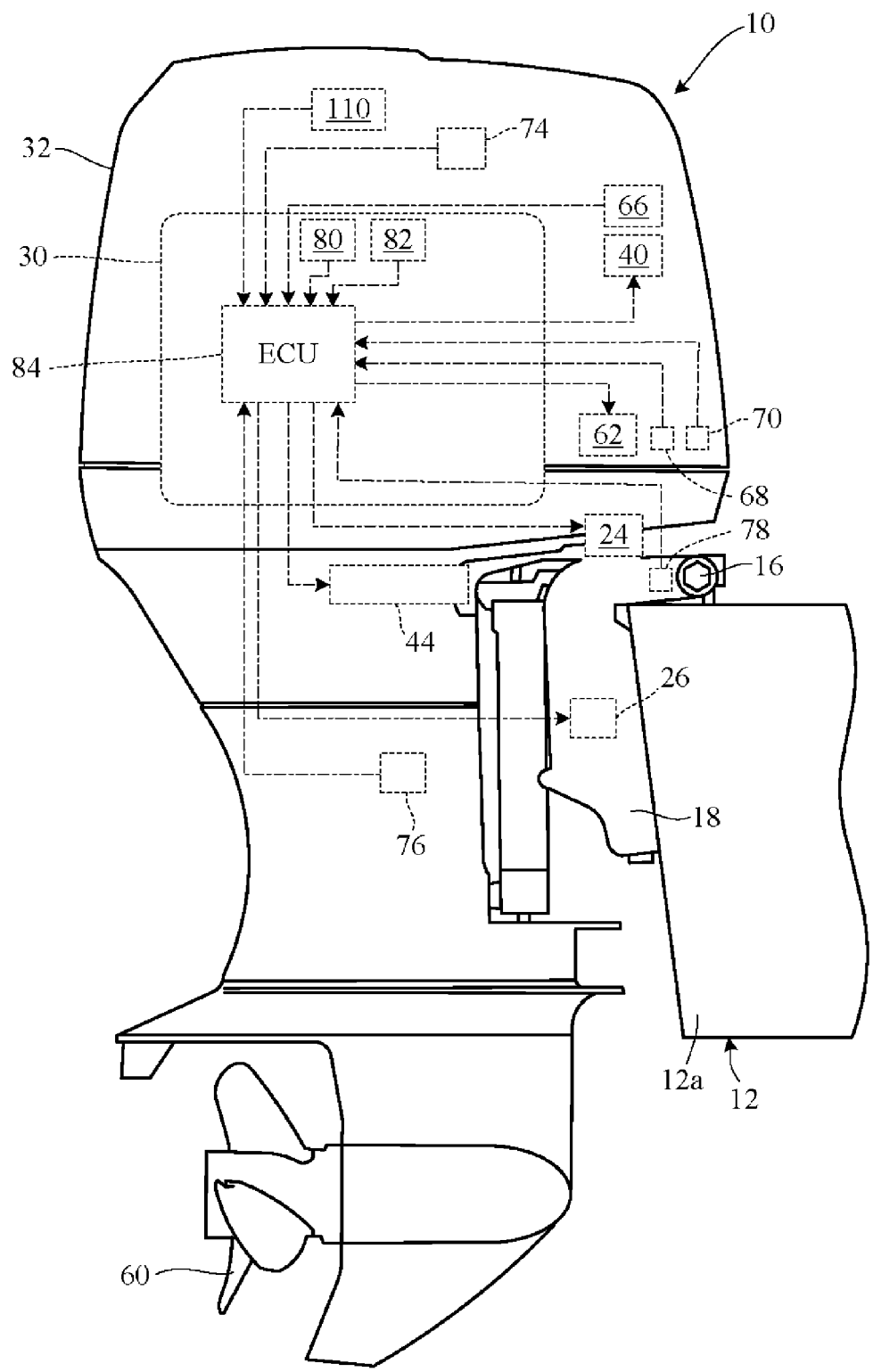
FIG. 3 is an explanatory diagram for explaining the same outboard motor.

FIG. 1 is a schematic diagram generally illustrating a small boat in the small boat collision avoidance apparatus according to an embodiment of this invention, FIG. 2 is an enlarged (partially cross-sectional) side view of an outboard motor mounted on the small boat of FIG. 1, and FIG. 3 is an explanatory diagram for explaining the same outboard motor.

Reference numeral 1 in FIG. 1 designates a small boat of the type usually called a motorboat. As termed in this specification, "small boat" refers to a boat of less than 20 gross tons. The small boat (called simply "boat" hereinafter) 1 is a so-called twin-outboard boat that has twin (even number of) outboard motors 10 mounted at a stern 12a of a hull (body) 12. In the following, the outboard motor on the left side (port side) relative to direction of forward moving is designated "first outboard motor 10A," with A appended as a subscript, and the outboard motor on the right side (starboard side) relative to direction of forward moving is designated "second outboard motor 10B," with B appended as a subscript.

The first outboard motor 10A and the second outboard motor 10B are thus mounted at the stern 12 of the hull 12 side by side at positions spaced apart from each other. As the first outboard motor 10A and the second outboard motor 10B are identically structured outboard motors, they are explained in the following as outboard motor 10 with the subscripts A and B omitted.

As shown in FIGS. 1 and 2, the outboard motor 10 has a swivel case 14 and a tilting shaft 16 by which it is attached through a stern bracket 18 to the stern 12a of the hull 12. Reference numeral 12b designates a bow of the hull 12 of the boat 1.

The outboard motor 10 is equipped with a mount frame 20 and a swivel shaft 22, and since the swivel shaft 22 is accommodated inside the swivel case 14 to be rotatable around a vertical axis, the outboard motor 10 is rotatable with respect to the hull 12 around the vertical axis. The upper and lower ends of the mount frame 20 are fastened to a frame (not shown) constituting a body of the outboard motor 10.

An electric steering motor 24 for driving the swivel shaft 22 and a power tilt-trim unit 26 that regulates tilt angle and trim angle of the outboard motor 10 with respect to the hull 12 are installed near the swivel case 14. An output shaft of the electric steering motor 24 is connected through a reduction gear mechanism 28 to an upper end of the mount frame 20. Specifically, a configuration is adopted by which rotational output of the electric steering motor 24 is transmitted through the reduction gear mechanism 28 to the mount frame 20, thereby enabling clockwise and counterclockwise rotation of the outboard motor 10 around a vertical axis, i.e., around the swivel shaft 22, as a steering axis.

The power tilt-trim unit 26 is integrally equipped with a hydraulic cylinder 26a for adjusting tilt angle and a hydraulic cylinder (trim actuator) 26b for adjusting trim angle (angles around a horizontal axis (pitch axis) of up-down outboard motor 10 rotation with respect to the hull 12), and using the tilting shaft 16 as an axis, the swivel case 14 can be rotated around a horizontal axis (pitch axis) perpendicular to the vertical axis by supplying or discharging hydraulic oil to or from the hydraulic cylinders 26a and 26b, thereby establishing a structure by which the outboard motor 10 can be tilted up/down and trimmed up/down.

An internal combustion engine 30 is installed at the upper portion of the outboard motor 10. The engine 30 is a spark-ignition water-cooled gasoline engine. The engine 30 is enclosed by an engine cover 32 and positioned above the water surface.

A throttle body 36 is connected to an air intake pipe 34 of the engine 30. The throttle body 36 has an internal throttle valve 38 and a throttle electric motor (throttle actuator) 40 for opening/closing the throttle valve 38 is integrally attached thereto.

An output shaft of the throttle electric motor 40 is connected to the throttle valve 38 through a reduction gear mechanism (not shown) installed adjacent to the throttle body 36. Engine speed is regulated by operating the throttle electric motor 40 to open and close the throttle valve 38 and thereby control air intake volume of the engine 30.

The outboard motor 10 is equipped with a driveshaft (vertical shaft) 42 rotatably supported parallel to the vertical axis, a torque converter 44 interposed between the engine 30 and the driveshaft 42, a hydraulic pump 46 attached to the driveshaft 42 for delivering hydraulic oil, and a reservoir 50 for storing hydraulic oil.

Driven by the engine 30, the hydraulic pump 46 pumps hydraulic oil from the reservoir 50 and supplies hydraulic oil to, inter alia, lubrication sites of the engine 30, the hydraulic cylinders 26a and 26b of the power tilt-trim unit 26, and a lock-up mechanism 44a of the torque converter 44.

A crankshaft 52 of the engine 30 is connected through a torque converter 44 to an upper end of the driveshaft 42, while a propeller shaft 56 supported to be rotatable around a horizontal axis is connected through a shift mechanism 54 to a lower end thereof. In the initial state of the power tilt-trim unit 26, the propeller shaft 56 is oriented with its axis 56a lying substantially parallel to the moving direction of the hull 12. A propeller 60 is attached to one end of the propeller shaft 56.

The shift mechanism 54 comprises, inter alia, a forward bevel gear 54a and a reverse bevel gear 54b connected to and rotated by the driveshaft 42, and a clutch 54c that enables the propeller shaft 56 to engage with either the bevel gear 54a or the reverse bevel gear 54b.

A shift electric motor 62 for driving the shift mechanism 54 is installed inside the engine cover 32, and an output shaft thereof is connectible through a reduction gear mechanism (not shown) with an upper end of a shift rod 54d of the shift mechanism 54. By operating the shift electric motor 62 to suitably vary position of the shift rod 54d and a shift slider 54e, the clutch 54c is operated to switch shift position between forward, reverse and neutral.

When the shift position is forward or reverse, rotation of the driveshaft 42 is transmitted through the shift mechanism 54 to the propeller shaft 56, whereby the propeller 60 is rotated to produce thrust in the forward or rearward moving of the hull 12. Moreover, a battery or other power supply unit (not illustrated) attached to the engine 30 of the outboard motor 10 supplies operating power to the electric motors 24, 40 and 62, etc.

Turning next to an explanation of sensors with reference to FIG. 3, a throttle position sensor 66 installed near the throttle valve 38 shown in FIG. 2 produces an output proportional to opening of the throttle valve 38 (more specifically throttle opening angle). A shift position sensor 68 installed near the shift rod 54d shown in FIG. 2 outputs a signal corresponding to shift position (neutral, forward or reverse), and a neutral switch 70 is also installed that outputs an ON signal when the shift position is neutral and an OFF signal when the shift position is forward or reverse.

A crankangle sensor 74 attached near the crankshaft 52 of the engine 30 shown in FIG. 2 outputs a pulse signal indicative of engine speed every prescribed crank angle, and a driveshaft rotational speed sensor 76 attached near the driveshaft 42 outputs a signal indicative of rotational speed of the driveshaft 42. A trim sensor (rotation angle sensor) 78 attached near the swivel case 14 produces an output corresponding to trim angle of the outboard motor 10.

Further, a GPS (Global Positioning System) receiver 80 attached at a suitable location on the outboard motor 10 receives satellite-transmitted GPS signals indicative of boat 1 position, and an orientation sensor 82 is installed that produces an output indicating orientation (direction) for the boat 1.

The outputs of the aforesaid sensors and switches are sent to an electronic control unit (herein referred to as "ECU") 84 mounted on the outboard motor 10. The ECU 84, which comprises a microcomputer having a CPU, ROM, RAM and other components, is mounted inside the engine cover 32 of the outboard motor 10. Based on signals received by the GPS receiver 80 and the output of the orientation sensor 82, the ECU 84 detects the current position, navigation speed and orientation for the boat 1. As shown in FIG. 1, a steering wheel 92 that can be rotated by the boat operator is installed near a boat operator's seat 90 of the hull 12. A steering angle sensor 94 attached to a shaft (not shown) of the steering wheel 92 produces an output indicating steering angle of the steering wheel 92 operated by the boat operator.

A shift-throttle lever 98 installed to be operable by the boat operator is provided on a dashboard 96 at the operator's seat 90. The shift-throttle lever 98, which is swingable back and forth from an initial position, is provide to be operable by the boat operator for inputting shift commands and engine speed regulation commands. A lever position sensor 100 attached near the shift-throttle lever 98 outputs a signal corresponding to the position to which the boat operator operates the shift-throttle lever 98.

A power tilt-trim switch 102 provided near the operator's seat 90 to be manually operable by the boat operator for inputting outboard motor 10 tilt angle and trim angle adjust commands outputs signals indicative of the outboard motor 10 tilt angle up/down and trim angle up/down commands.

In addition, navigation instruments 104 including gauges and meters indicating navigation speed and so forth and a compass and the like are installed on the dashboard 96 near the operator's seat 90, and a display 106 is also installed. The display 106 has a screen showing an x-y coordinate plane whose x-axis represents boat 1 lateral (horizontal) direction (pitch axis) and y-axis represents boat 1 direction of movement (roll axis), and upon which position and orientation of the boat 1 obtained from the GPS receiver 80 and the orientation sensor 82 are displayed.

Outputs of the steering angle sensor 94, lever position sensor 100 and power tilt-trim switch 102 are also inputted to the ECU 84. Based on the outputs of the aforesaid sensors and switches, the ECU 84 controls operation of the different electric motors and operates the power tilt-trim unit 26 to adjust the trim angle.

In addition, as shown in FIGS. 1 and 3, an inclinometer 110 is installed in the outboard motor 10. The inclinometer 110 uses capacitance change or the like to produce an output indicating inclination (list or tilt) of the hull 12 relative to the vertical axis around the pitch axis (x-axis) and around the roll axis (y). The output of the inclinometer 110 is also inputted to the ECU 84.

Although the foregoing explanation of the outboard motor 10 relates to the first outboard motor 10A, the same also applies to the second outboard motor 10B. In the following, the ECU 84 located in the first outboard motor 10A is designated as first ECU 84A and the ECU 84 located in the second outboard motor 10B is designated as second ECU 84B. The first ECU 84A and second ECU 84B are wire connected (not shown) and configured to be communicable with each other.

However, the inclinometer 110 is provided in at least one of the first and second outboard motors 10A and 10B, specifically only in the first outboard motor 10A as shown in FIG. 1. Alternatively, the inclinometer 110 can be installed in the second outboard motor 10B or, as indicated by imaginary lines, at a suitable location on the hull 12.

Figure 4:
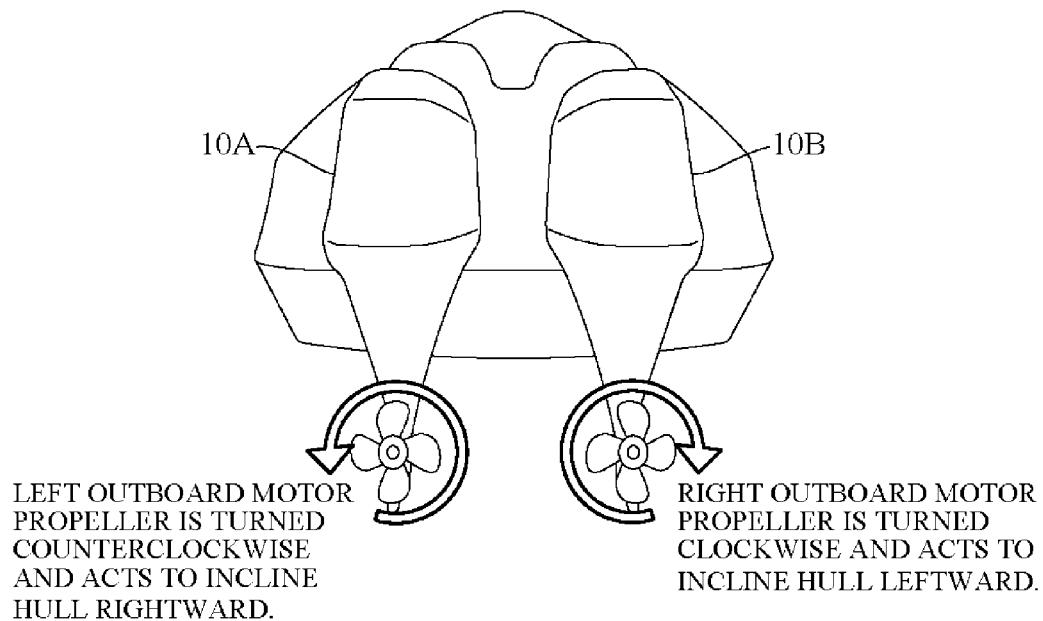
FIG. 4 is an explanatory view of the boat of FIG. 1 viewed from behind.

Now turning to an explanation of the rotational directions of the propellers 60 attached to the first outboard motor 10A and the second outboard motor 10B, when viewed from behind the boat 1 as shown in FIG. 4, the propeller 60 of the first outboard motor 10A on the left side is turned counterclockwise and acts to tilt the hull 12 rightward (starboard), while the propeller 60 of the second outboard motor 10B on the right side is turned clockwise and acts to incline or tilt the hull 12 leftward (port), so that reaction forces of the two propellers offset each other.

Figure 5:
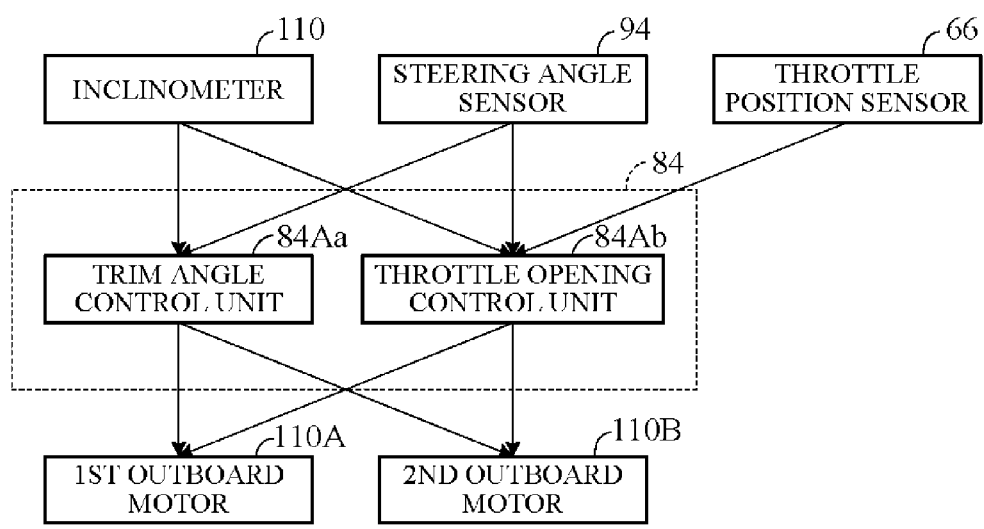
FIG. 5 is a block diagram functionally depicting a configuration of the posture control apparatus according to this embodiment.

FIG. 5 is a block diagram functionally depicting a configuration of the first ECU 84A of the posture control apparatus according to this embodiment, FIG. 6 is a flowchart showing posture control operations of the first ECU 84A of FIG. 5 with respect to fore-aft inclination, and FIGS. 7A and 7B are explanatory diagrams for explaining the same.

In this embodiment, as the inclinometer 110 is installed in the first outboard motor 10A, the first ECU 84A is defined as the ECU 84, but when the inclinometer 110 is installed in the second outboard motor 10B, the second ECU 84B is defined as the ECU 84. However, regardless of which outboard motor has the inclinometer 110, posture control is cooperatively implemented in the posture control apparatus according to this embodiment by communicating from one ECU 84 to the other ECU 84.

Now to explain, in the posture control apparatus according to this embodiment, the first ECU 84A of the first outboard motor 10A has a trim angle control unit (control means) 84Aa for fore-aft inclination control and a throttle opening control unit (control means) 84Ab for lateral (side-to-side) inclination control. The trim angle control unit 84Aa receives the outputs of the inclinometer 110 and the steering position sensor 94 as inputs, and the throttle opening control unit 84Ab receives the outputs of the inclinometer 110, the steering position sensor 94 and the throttle position sensor 66 as input.

The trim angle control unit 84Aa calculates required trim angle change amount based on the inputted sensor detection values and instructs a hydraulic circuit of the trim actuator (trim adjustment hydraulic cylinder) 26b of the power tilt-trim unit 26 to trim up or down. Further, the throttle opening control unit 84Ab calculates required throttle opening change amount based on the inputted sensor detection values and instructs an energizing circuit of the throttle actuator (throttle electric motor) 40 to increase or decrease throttle opening.

In the following, operation of the trim angle control unit 84Aa with respect to fore-aft inclination is explained with reference to the flowchart of FIG. 6.

First, in S10 (S: processing Step), it is determined from the output of the steering angle sensor 94 whether the boat 1 goes straight ahead and the determination is repeated until the result is YES.

When the result in S10 is YES, the program goes to S12, in which it is determined whether the bow 12b of the hull 12 is up as shown in FIG. 7A. In other words, it is determined from the output of the inclinometer 110 whether, as shown in FIG. 7A, the bow 12b of the hull 12 inclines upward in a direction of the vertical axis around the pitch axis.

When the result in S12 is YES, the program goes to S14, in which trim-up instructions are issued to increase the trim angles of both the first and second outboard motors 10A and 10B. In other words, the trim actuators (trim adjustment hydraulic cylinders) 26b are instructed to extend.

On the other hand, when the result in S12 is NO, the program goes to S16, in which it is determined whether the bow 12b of the hull 12 is down as shown in FIG. 7B, i.e., to be specific, it is determined from the output of the tilt sensor 110 whether the bow 12b of the hull 12 inclines downward in the direction of the vertical axis around the pitch axis.

When the result in S16 is NO, the program returns to S10, and when YES, goes to S18, in which trim-down instructions are issued to decrease the trim angles of both the first and second outboard motors 10A and 10B. Specifically, the trim actuators (trim adjustment hydraulic cylinders) 26b are instructed to contract.

To elaborate, when the bow is up as shown in FIG. 7A, thrust is diagonally downward and efficiency decreases if left this way, so trim-up is continued until the axes 56a of the propeller shafts 56 of the first and second outboard motors 10A and 10B (thrust directions; shown in FIG. 2) become parallel to the water surface, while when the bow is down as shown in FIG. 7B, thrust is diagonally upward and efficiency again decreases, so trim-down is continued until the axes 56a of the propeller shafts 56 of the first and second outboard motors 10A and 10B become parallel to the water surface.

As a result, the posture of the boat 1 (or hull 12) is surely stabilized, and riding comfort and steering performance are improved. Moreover, no deceleration of boat (navigation) speed occurs. In addition, even if the hull 12 should incline fore-aft owing to acceleration, the outboard motors 10 constantly remain parallel to the water surface, so fuel efficiency can be improved and transition to a plane posture promoted.

Next, operation of the throttle opening control unit 84Ab with respect to side-to-side inclination is explained with reference to the flowchart of FIG. 8.

First, in S100, it is determined from the output of the steering angle sensor 94 whether the boat 1 goes forward and the determination is repeated until the result is YES.

Figure 9A:
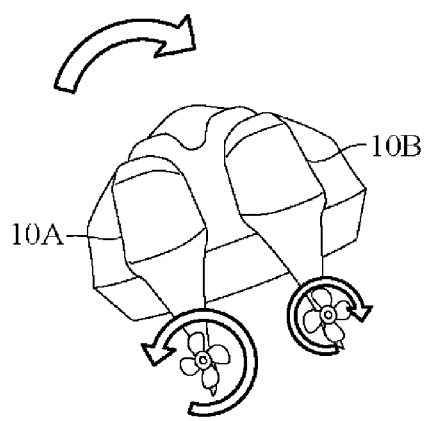
FIGS. 9A and 9B are explanatory diagrams for also explaining the operation of FIG. 8.

When the result in S100 is YES, the program goes to S102, in which it is again determined from the output of the steering angle sensor 94 whether the boat 1 go straight ahead. When the result in S102 is YES, the program goes to S104, in which it is determined whether the hull 12 inclines (list) to port (left) in a direction of the vertical axis around the roll axis. Namely, it is determined from the output of the inclinometer 110 whether the port side of the hull 12 inclines downward in the direction of the vertical axis around the roll axis as shown in FIG. 9A.

When the result in S104 is YES, the program goes to S106, in which operation of the throttle actuator 40 of the outboard motor located on a side determined to increase downward in the direction of the vertical axis around the roll axis, i.e., the port side first outboard motor 10A is controlled to widen the opening of the throttle valve 38 and increase the speed of the engine 30 (to raise thrust), while operation of the throttle actuator 40 of the other outboard motor located on a side determined to increase upward in the direction of the vertical axis around the roll axis, i.e., the starboard side second outboard motor 10B is controlled to decrease the speed of its engine 30 (to lower thrust).

On the other hand, when the result in S104 is NO, the program goes to S108, in which it is determined whether the hull 12 inclines to starboard. Namely, it is determined from the output of the inclinometer 110 whether the starboard side of the hull 12 inclines downward in the direction of the vertical axis around the roll axis as shown in FIG. 9B.

When the result in S108 is NO, the program returns to S100, but when the result in S108 is YES, the program goes to S110, in which operation of the throttle actuator 40 of the engine 30 of the outboard motor located on a side determined to incline downward in the direction of the vertical axis around the roll axis, i.e., the starboard side second outboard motor 10B is controlled to widen the opening of the throttle valve 38 and increase the engine speed (to raise thrust), while operation of the throttle actuator 40 of the other outboard motor located on a side determined to incline upward in the direction of the vertical axis around the roll axis, i.e., i.e., the port side first outboard motor 10A is controlled to decrease the speed of its engine 30 (to lower thrust).

Figure 9B:
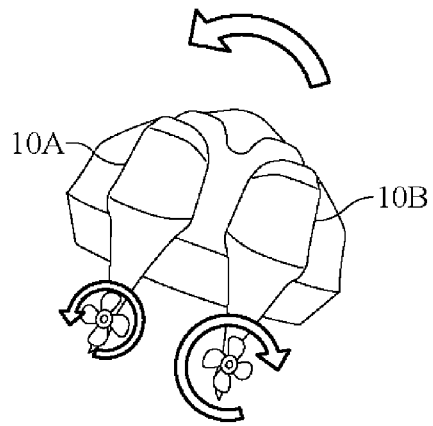

Thus, as shown in FIGS. 9A and 9B, control is implemented to raise thrust of the port side first outboard motor 10A and lower thrust of the starboard side second outboard motor 10B in the case of port list, whereby the propellers 60 generate clockwise torque that restores the hull 12 to horizontal, and to raise thrust of the starboard side second outboard motor 10B and lower thrust of the port side first outboard motor 10A in the case of starboard list, whereby the propellers 60 generate counterclockwise torque that restores the hull 12 to horizontal. As a result, the posture of the boat 1 (hull 12) is reliably stabilized, while riding comfort and steering performance are improved. Moreover, no deceleration of running speed occurs.

Figure 8:
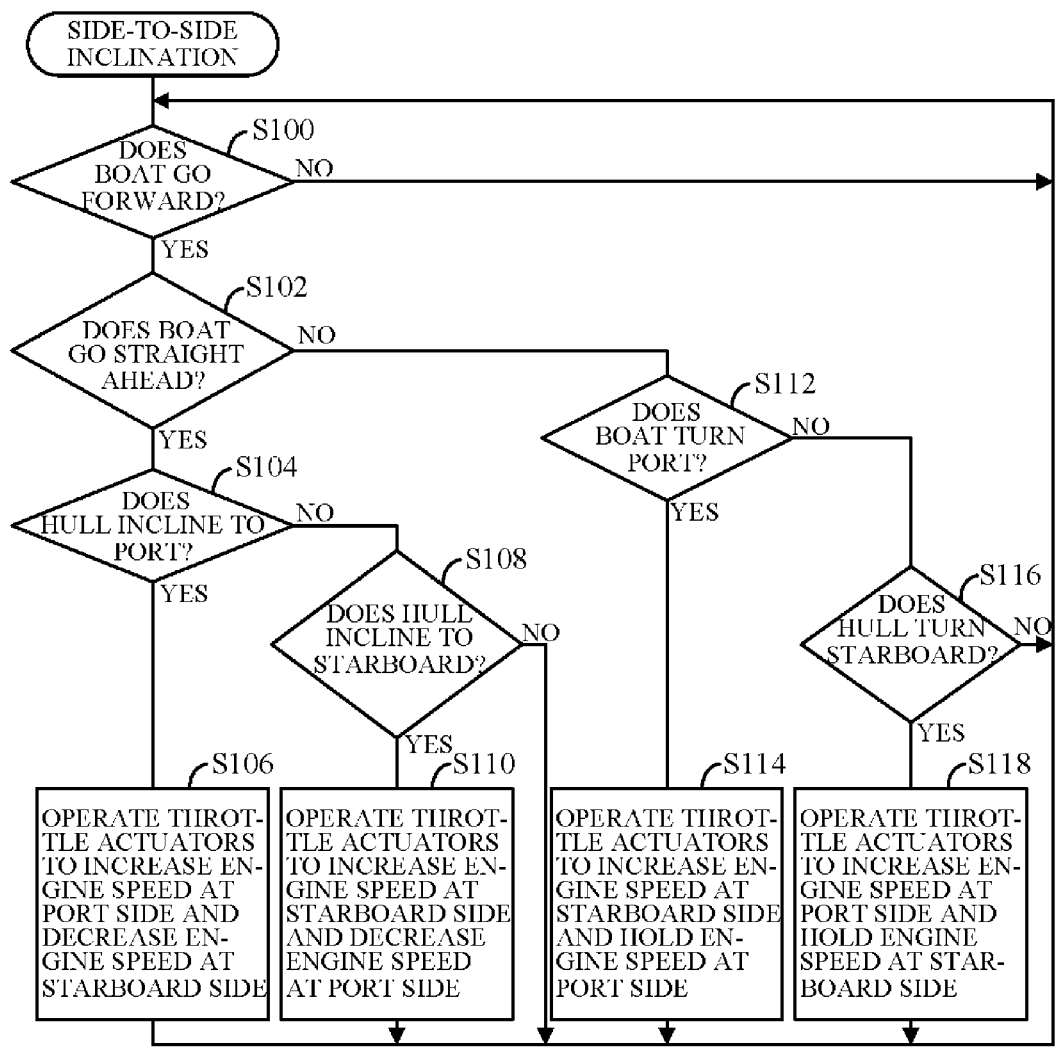
FIG. 8 is a flowchart showing another operation of the posture control apparatus of FIG. 5.

Returning to the explanation of the flowchart of FIG. 8, when the result in S102 is NO, the program goes to S112, in which it is determined from the output of the steering angle sensor 94 whether the boat turns port (left).

When the result in S112 is YES, the program goes to S114, in which control is implemented to operate the throttle actuators 40 of the outboard motor located on the port side (inside) to hold (keep) the engine speed (namely to hold thrust), while the control is implemented to operate the throttle actuator 40 of the outboard motor located on the starboard side (outside), namely the second outboard motor 10B to increase the engine speed (namely to raise thrust), during turning.

On the other hand, when the result in S112 is NO, the program goes to S116, in which it is determined from the output of the steering angle sensor 94 whether the boat 1 turns starboard (right). When the result in S116 is NO, the program returns to S100, and when YES, goes to S118, in which control is implemented to operate the throttle actuators 40 of the outboard motor located on the port side (outside), namely the first outboard motor 10A to increase the engine speed (to raise trust), while the engine speed of the outboard motor located on the starboard side (inside), namely the second outboard motor 10B is controlled as it is (to hold thrust).

Figure 10A:
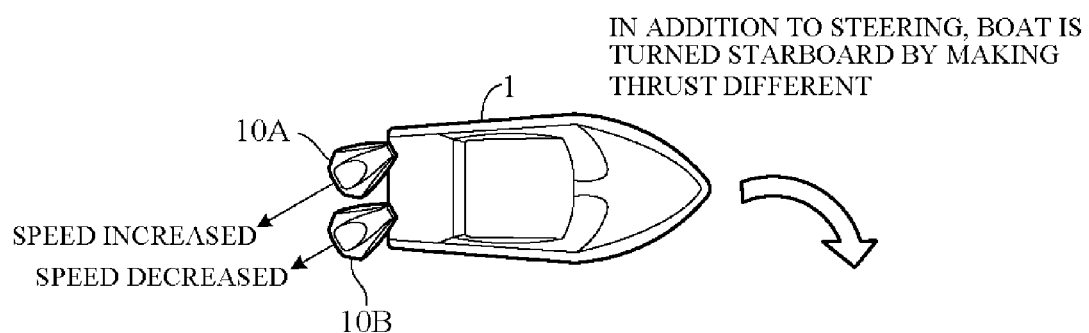
FIGS. 10A and 10B are explanatory diagrams for additionally explaining the operation of FIG. 8.
Figure 10B:
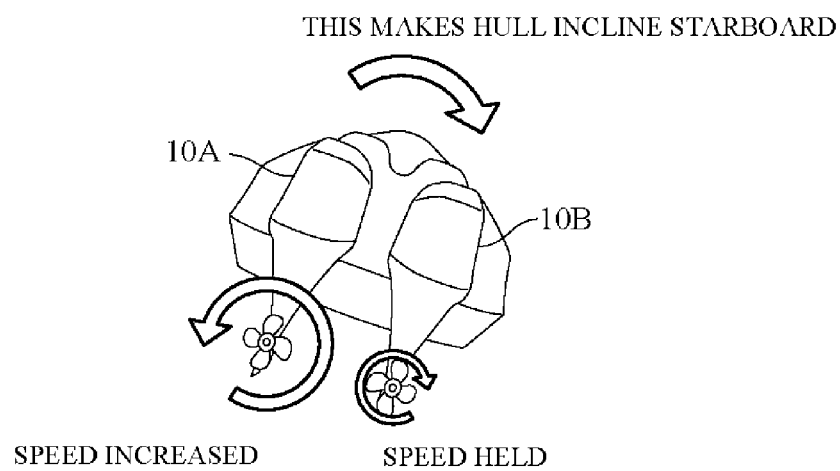

In other words, similarly to in the case of torque vectoring during turning of a four-wheel-drive vehicle, when turning right (starboard), for example, as shown in FIG. 10A, thrust (engine speed) of the outboard motor 10 located on the outside side (analogous to outer wheels of a vehicle; left side in the illustrated example) is deliberately increased as shown in FIG. 10B, thereby making it possible to generate a force that turns the hull 12 inward (i.e., starboard in the illustrated example) and a force that produces inward inclination. As a result, turning performance of the boat 1 (hull 12) can be improved because a thrust differential contributes to turning of steering.

As stated above, the embodiment is configured to have an apparatus and method for controlling posture of a small boat (1) having a hull (12) and an even number of outboard motors (10; 10A, 10B) mounted side by side on a stern (12a) of the hull, each of the outboard motors being equipped with a propeller (60) driven by a built-in engine (30) and a throttle actuator (throttle electric motor 40) capable of adjusting opening of a throttle valve (38) installed in the engine, comprising: an inclinometer (110) installed in at least one of the outboard motors that produces an output indicating inclination of the hull relative to a vertical axis around a roll axis; and a throttle opening control unit (84Ab; S100-S110) that determines whether the hull inclines to port or starboard in a direction of the vertical axis around the roll axis from the output of the inclinometer and when it is determined that the hull inclines to port or starboard in the direction of the vertical axis, controls operation of the throttle actuator of the outboard motor on a side determined to incline downward in the direction of the vertical axis to increase speed of the engine, while controlling operation of the throttle actuator of the outboard motor located on a side determined to incline upward in the direction of the vertical axis to decrease the speed of the engine.

With this, inclination of the hull 12 can be restored toward horizontal to enable reliable stabilization of boat posture, while riding comfort and steering performance can also be improved. Moreover, boat navigation speed is not lowered and no trim tabs or other complicated mechanisms are required.

The apparatus and method further include: a steering angle sensor (94) that produces an output indicating a steering angle of a steering wheel (92) installed on the boat; and the throttle opening control unit (86Ab) determines whether the hull inclines to port or starboard when it is determined from the output of the steering angle sensor that the boat goes straight ahead.

With this, it becomes possible to stabilize boat posture more reliably when the boat 1 (and hull 12) goes straight ahead.

The apparatus and method further include: a trim actuator (hydraulic cylinder 26b) that regulates trim angle of the outboard motor with respect to the hull; a second inclinometer (110) installed in at least one of the outboard motors that produces an output indicating inclination of the hull relative to a vertical axis around a pitch axis; and a trim angle control unit (84Aba, S10-S18) that determines whether a bow (12b) of the hull inclines upward or downward in a direction of the vertical axis around the pitch axis from the output of the inclinometer, and controls operation of the trim actuator to increase the trim angle when it is determined that the bow of the hull inclines upwards, while controlling operation of the trim actuator to decrease the trim angle when it is determined that the bow of the hull inclines downward.

With this, the posture of the boat 1 (and hull 12) is surely stabilized, and riding comfort and steering performance are improved. Moreover, no deceleration of boat (navigation) speed occurs. In addition, even if the hull 12 should incline fore-aft owing to acceleration, the outboard motors 10 constantly remain parallel to the water surface, so fuel efficiency can be improved and transition to a plane posture promoted.

The apparatus and method further include: a steering angle sensor (94) that produces an output indicating steering angle of a steering wheel installed on the boat; and the trim angle control unit determines whether the bow of the hull inclines upward or downward in the direction of the vertical axis when it is determined from the output of the steering angle sensor that the boat goes straight ahead.

With this, it becomes possible to stabilize boat posture more reliably when the boat 1 (and hull 12) goes straight ahead.

The apparatus and method further include: a steering angle sensor (94) that produces an output indicating steering angle of a steering wheel installed on the boat; and the throttle opening control unit (84Aab, S112-S118) determines whether the boat turns port or starboard from the output of the steering angle sensor and when it is determined that the boat turns port or starboard, controls operation of the throttle actuator of the outboard motor located on outside to increase speed of the engine, while controlling operation of the throttle actuator of the outboard motor located on inside to hold the speed of the engine.

With this, turning performance of the boat 1 (hull 12) can be improved because a thrust differential contributes to turning of steering.

The apparatus and method further include: a trim actuator (26b) that regulates trim angle of the outboard motor with respect to the hull; an inclinometer (110) installed in at least one of the outboard motors that produces an output indicating inclination of the hull relative to a vertical axis around a pitch axis; and a trim angle control unit (84Aba, S10-S18) that determines whether a bow of the hull inclines upward or downward in a direction of the vertical axis around the pitch axis from the output of the inclinometer, and controls operation of the trim actuator to increase the trim angles when it is determined that the bow of the hull inclines upwards, while controlling operation of the trim actuator to decrease the trim angles when it is determined that the bow of the hull inclines downward.

With this, the posture of the boat 1 (and hull 12) is surely stabilized.

The apparatus and method further include: a steering angle sensor (94) that produces an output indicating a steering angle of a steering wheel installed on the boat; and the trim angle control unit determines whether the bow of the hull inclines upward or downward in the direction of the vertical axis when it is determined from the output of the steering angle sensor that the boat goes straight ahead.

With this, it becomes possible to stabilize boat posture more reliably when the boat 1 (and hull 12) goes straight ahead.

It should be noted in the above that twin outboard motors 10 are taken as an example of the even number of outboard motors, they may be four out board motors 10.

It should also be noted that the sensors including the inclinometer 110 should not be limited to those disclosed.

It should further be noted that, although a pleasure boat, namely, a motor boat, is exemplified as a small boat in the foregoing, this invention is not limited to such an application but can also be applied to fishing boats and various other watercraft. Moreover, this invention is suitable for application not only in an outboard motor boat with stern-mounted outboard motors as illustrated in the drawings but also in an inboard motor boat having one or more engines mounted inside.

While the present invention has been described with reference to the preferred embodiments thereof, it will be understood, by those skilled in the art, that various changes and modifications may be made thereto without departing from the scope of the appended claims.

What is claimed is:

1. An apparatus for controlling posture of a small boat having a hull and an even number of outboard motors mounted side by side on a stern of the hull, each of the outboard motors being equipped with a propeller driven by a built-in engine and a throttle actuator capable of adjusting opening of a throttle valve installed in the engine, comprising:

an inclinometer installed in at least one of the outboard motors that produces an output indicating inclination of the hull relative to a vertical axis around a roll axis; and a throttle opening control unit that determines whether the hull inclines to port or starboard in a direction of the vertical axis around the roll axis from the output of the inclinometer and when it is determined that the hull inclines to port or starboard in the direction of the vertical axis, controls operation of the throttle actuator of the outboard motor located on a side determined to incline downward in the direction of the vertical axis to increase speed of the engine, while controlling operation of the throttle actuator of the outboard motor located on a side determined to incline upward in the direction of the vertical axis to decrease the speed of the engine.

2. The apparatus according to claim 1, further including:
a steering angle sensor that produces an output indicating a steering angle of a steering wheel installed on the boat; and
the throttle opening control unit determines whether the hull inclines to port or starboard when it is determined from the output of the steering angle sensor that the boat goes straight ahead.

3. The apparatus according to claim 1, further including:
a trim actuator that regulates trim angle of the outboard motor with respect to the hull;
a second inclinometer installed in at least one of the outboard motors that produces an output indicating inclination of the hull relative to a vertical axis around a pitch axis; and
a trim angle control unit that determines whether a bow of the hull inclines upward or downward in a direction of the vertical axis around the pitch axis from the output of the second inclinometer, and controls operation of the trim actuator to increase the trim angle when it is determined that the bow of the hull inclines upwards, while controlling operation of the trim actuator to decrease the trim angle when it is determined that the bow of the hull inclines downward.

4. The apparatus according to claim 3, further including:
a steering angle sensor that produces an output indicating steering angle of a steering wheel installed on the boat; and
the trim angle control unit determines whether the bow of the hull inclines upward or downward in the direction of the vertical axis when it is determined from the output of the steering angle sensor that the boat goes straight ahead.

5. The apparatus according to claim 1, further including:
a steering angle sensor that produces an output indicating steering angle of a steering wheel installed on the boat; and
the throttle opening control unit determines whether the boat turns port or starboard from the output of the steering angle sensor and when it is determined that the boat turns port or starboard, controls operation of the throttle actuator of the outboard motor located on outside to increase speed of the engine, while controlling operation of the throttle actuator of the outboard motor located on inside to hold the speed of the engine.

6. The apparatus according to claim 5, further including:
a trim actuator that regulates trim angle of the outboard motor with respect to the hull;
a second inclinometer installed in at least one of the outboard motors that produces an output indicating inclination of the hull relative to a vertical axis around a pitch axis; and
a trim angle control unit that determines whether a bow of the hull inclines upward or downward in a direction of the vertical axis around the pitch axis from the output of the second inclinometer, and controls operation of the trim actuator to increase the trim angles when it is determined that the bow of the hull inclines upwards, while controlling operation of the trim actuator to decrease the trim angles when it is determined that the bow of the hull inclines downward.

7. The apparatus according to claim 6, further including:
a steering angle sensor that produces an output indicating steering angle of a steering wheel installed on the boat; and
the trim angle control unit determines whether the bow of the hull inclines upward or downward in the direction of the vertical axis when it is determined from the output of the steering angle sensor that the boat goes straight ahead.

8. A method for controlling posture of a small boat having a hull and an even number of outboard motors mounted side by side on a stern of the hull, each of the outboard motors being equipped with a propeller driven by a built-in engine and a throttle actuator capable of adjusting opening of a throttle valve installed in the engine, comprising the steps of:
detecting, using an inclinometer, inclination of the hull relative to a vertical axis around a roll axis; and
determining, using a control unit, whether the hull inclines to port or starboard in a direction of the vertical axis around the roll axis from the detected inclination and when it is determined that the hull inclines to port or starboard in the direction of the vertical axis, controlling operation of the throttle actuator of the outboard motor located on a side determined to incline downward in the direction of the vertical axis to increase speed of the engine, while controlling operation of the throttle actuator of the outboard motor located on a side determined to incline upward in the direction of the vertical axis to decrease the speed of the engine.

9. The method according to claim 8, further including the step of:
detecting a steering angle of a steering wheel installed on the boat; and
the step of determining determines whether the hull inclines to port or starboard when it is determined from the detected steering angle that the boat goes straight ahead.

10. The method according to claim 8, further including the step of:
detecting inclination of the hull relative to a vertical axis around a pitch axis; and
determining whether a bow of the hull inclines upward or downward in a direction of the vertical axis around the pitch axis from the detected inclination, and controlling operation of a trim actuator that regulates trim angle of the outboard motor with respect to the hull to increase the trim angle when it is determined that the bow of the hull inclines upwards, while controlling operation of the trim actuator to decrease the trim angle when it is determined that the bow of the hull inclines downward.

11. The method according to claim 10, further including the step of:
detecting steering angle of a steering wheel installed on the boat; and
the step of determining determines whether the bow of the hull inclines upward or downward in the direction of the vertical axis when it is determined from the detected steering angle that the boat goes straight ahead.

12. The method according to claim 8, further including the steps of:
detecting steering angle of a steering wheel installed on the boat; and
determining whether the boat turns port or starboard from the detected steering angle and when it is determined that the boat turns port or starboard, controlling operation of the throttle actuator of the outboard motor located on outside to increase speed of the engine, while controlling operation of the throttle actuator of the outboard motor located on inside to hold the speed of the engine.

13. The method according to claim 12, further including the steps of:
- detecting inclination of the hull relative to a vertical axis around a pitch axis; and
- determining whether a bow of the hull inclines upward or downward in a direction of the vertical axis around the pitch axis from the detected inclination, and controlling operation of a trim actuator that regulates trim angle of the outboard motor with respect to the hull to increase the trim angles when it is determined that the bow of the hull inclines upwards, while controlling operation of the trim actuators of the outboard motors to decrease the trim angles when it is determined that the bow of the hull inclines downward.

14. The method according to claim 13, further including the step of:
- detecting steering angle of a steering wheel installed on the boat; and
- the step of determining determines whether the bow of the hull inclines upward or downward in the direction of the vertical axis when it is determined that the boat goes straight ahead.

\* \* \* \* \*